(12) United States Patent
Joshi

(10) Patent No.: US 9,378,349 B2
(45) Date of Patent: Jun. 28, 2016

(54) ENABLING SECURE TRANSACTIONS BETWEEN SPOKEN WEB SITES

(75) Inventor: Anupam Joshi, Ellicott City, MD (US)

(73) Assignee: International Business Machines Corporation, Armonk, NV (US)

( * ) Notice: Subject to any disclaimer, the term of this patent is extended or adjusted under 35 U.S.C. 154(b) by 101 days.

(21) Appl. No.: 13/569,426

(22) Filed: Aug. 8, 2012

(65) Prior Publication Data

US 2012/0303372 A1    Nov. 29, 2012

Related U.S. Application Data

(63) Continuation of application No. 12/546,072, filed on Aug. 24, 2009, now Pat. No. 9,223,953.

(51) Int. Cl.
*G06Q 20/00* (2012.01)
*G06F 21/32* (2013.01)

(52) U.S. Cl.
CPC ..................... *G06F 21/32* (2013.01)

(58) Field of Classification Search
USPC .............. 705/64, 16, 21, 59, 71; 380/44, 202, 380/278, 279
See application file for complete search history.

(56) References Cited

U.S. PATENT DOCUMENTS

| | | | |
|---|---|---|---|
| 6,175,626 B1 | 1/2001 | Aucsmith et al. | |
| 6,311,042 B1* | 10/2001 | DeSchrijver | G06F 3/03545 340/5.52 |
| 7,206,932 B1 | 4/2007 | Kirchhoff | |
| 2002/0046092 A1 | 4/2002 | Ostroff | |
| 2005/0228782 A1 | 10/2005 | Bronstein et al. | |
| 2007/0255953 A1 | 11/2007 | Peyret | |
| 2008/0071537 A1* | 3/2008 | Tamir | G07C 9/00087 704/246 |
| 2008/0091596 A1 | 4/2008 | Labaton | |
| 2008/0141353 A1* | 6/2008 | Brown | G10L 13/00 726/7 |
| 2008/0144783 A1 | 6/2008 | Kumar et al. | |
| 2009/0138269 A1 | 5/2009 | Agarwal et al. | |
| 2009/0161839 A1 | 6/2009 | Neumann | |

OTHER PUBLICATIONS

Entrust Identity Guard—Multifactor Authentication Methods, 2009, pp. 1-4.
Wang et al., Voice Pharming Attack and the Trust of VoIP, SecureComm 2008, Sep. 22-25, 2008, Istanbul, Turkey, 2008 ACM.
Rescorla, Network Working Group, http://www.ietf.org/rfc/rfc2818.txt RTFM, Inc., May 2000, pp. 1-7.

* cited by examiner

*Primary Examiner* — Dante Ravetti
(74) *Attorney, Agent, or Firm* — Ryan, Mason & Lewis, LLP

(57) ABSTRACT

Techniques for enabling a secure transaction with a remote site that uses voice interaction are provided. The techniques include authenticating a remote site to enable a secure transaction, wherein authenticating the remote site comprises using a dynamically generated audio signal.

11 Claims, 2 Drawing Sheets

ENABLING SECURE TRANSACTIONS BETWEEN SPOKEN WEB SITES

CROSS-REFERENCE TO RELATED APPLICATIONS

This application is a continuation of U.S. patent application Ser. No. 12/546,072, filed Aug. 24, 2009, incorporated by reference herein.

FIELD OF THE INVENTION

Embodiments of the invention generally relate to information technology, and, more particularly, to spoken web transactions.

BACKGROUND OF THE INVENTION

The present web of information created by the hypertext transfer protocol is not accessible to a large portion of the public due to illiteracy, lack of access to computers or internet, etc. Compared to internet, cell phones have much greater penetration. A spoken web system is a key element of the expanding access to information technology to illiterate or semi-literate people. However, existing spoken web protocols (such as HyperSpeech Transfer Protocol—HSTP) do not have a strong security component, which serves as a bar to its potential deployment in supporting commercial transactions.

Spoken web allows for hyperlinks that automatically take a user from one voice site to the other. However, there is no way for a user to validate that he has indeed reached the site that he thought he was being taken to. This makes the protocol vulnerable to a variety of session attacks. A challenge exists for knowing that an individual has reached an intended site when dealing with voice traversal to sites that solicit confidential information such as, for example, payment gateways. Secure Hypertext transfer protocol (HTTPS) authentication cannot be used because it relies on visual cues in the browser (for example, a lock icon) to denote authentication, and the user reading the certificate details to verify that she is on the correct site.

This same problem exists for interactive voice response (IVR) systems. Existing IVRs that perform transactions can be reached by the user directly via a dialed number, but the connection is also potentially insecure.

SUMMARY OF THE INVENTION

Principles and embodiments of the invention provide techniques for enabling secure transactions between spoken web sites. An exemplary method (which may be computer-implemented) for enabling a secure transaction with a remote site that uses voice interaction, according to one aspect of the invention, can include authenticating a remote site to enable a secure transaction, wherein authenticating the remote site comprises using a dynamically generated audio signal.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps. Further again, one or more embodiments of the invention can be carried out on an apparatus such as one or more landline or cellular phones.

Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
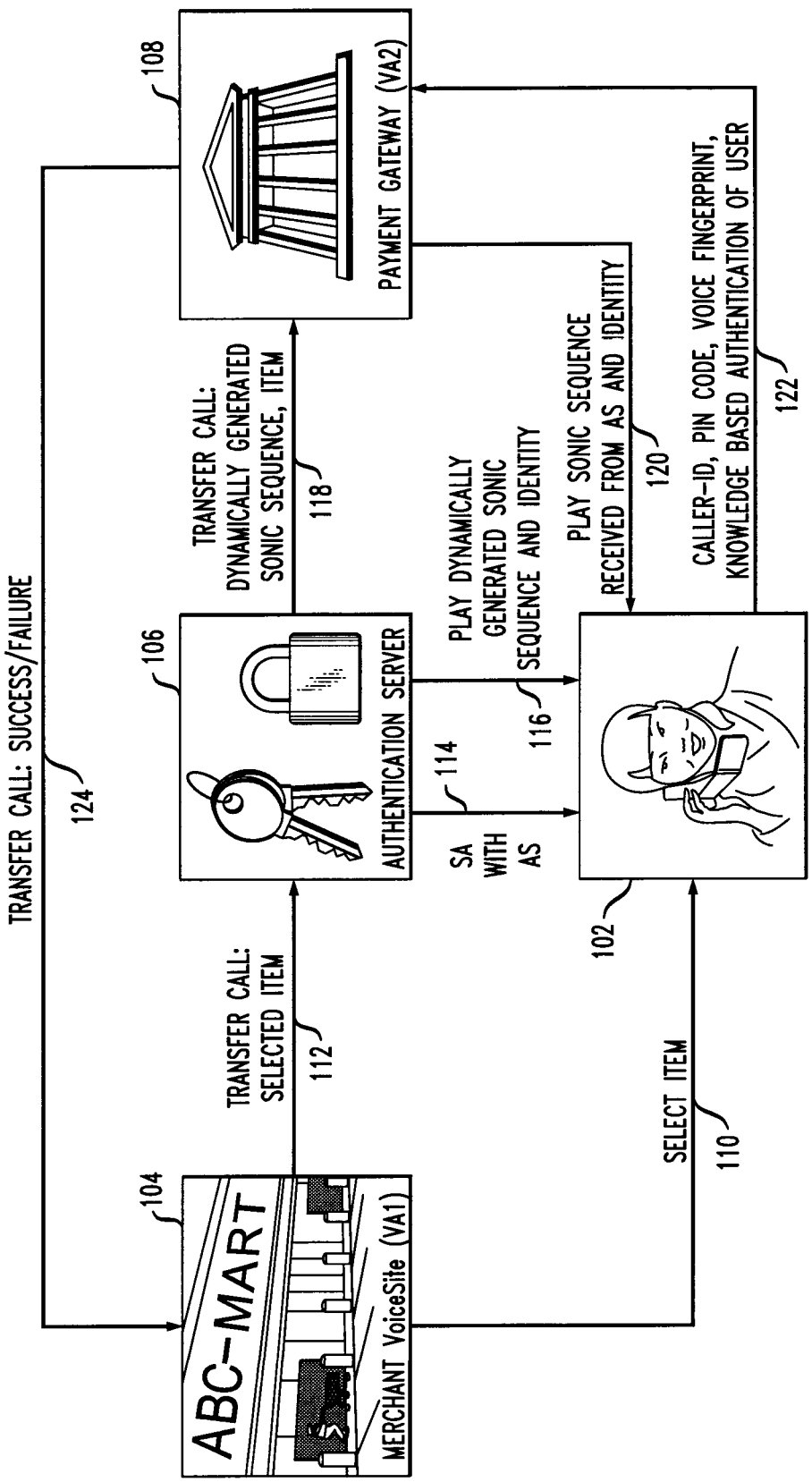
FIG. 1 is a diagram illustrating an exemplary embodiment, according to an aspect of the invention.

Principles of the invention include securing hyperspeech transfer protocol (HSTP) to enable secure transactions between spoken web sites, as well as securing voice interactions. Spoken web has been described, for example, in U.S. patent application Ser. No. 11/946,195, entitled "System and Method for Enabling Voice Driven Interactions Among Multiple IVR's, Constituting a Voice Workflow," as well as in U.S. patent application Ser. No. 11/612,787, entitled "System and Method Generating Voice Sites," the disclosures of which are incorporated by reference herein. One or more embodiments of the invention include authenticating a voice-based service location or site to a user and encoding the identity (for example, the Distinguished Name (DN) field of a digital certificate) of a voice-based service location or site into an audio signal to be played to the user accessing the voice-based service location or site.

Additionally, one or more embodiments of the invention can include playing an audio signal corresponding to a location or site of a voice-based service in an interactive voice response system (IVRS), as well as extending the concept of secure socket layer (SSL) and/or transport layer security (TLS) to HSTP.

The techniques detailed herein include using short sonic sequences (for example, phrases, random word mixtures and/or non-word mixtures) as the proof of identity. The sonic sequence can be in any human language or none at all. Instead of a lock symbol or green background uniform resource locator (URL) on a browser, the user of a voice browser is given a sonic sequence that he should expect to hear from the voice site to which he has been allegedly transferred. The identity of a site can also be read to him by a trusted third-party. Given that in the spoken web situation, visual cues or text are not possible, existing approaches like lock symbols will not work.

One or more embodiments of the invention can include links to voice sites where authentication is required being marked as hstps (that is, the secure version of the hstp protocol) rather than hstp. When this request commences, an authentication step (for example, authenticateNumber()) will take place before the transferHSTPSession( ) method of the spoken web protocol is called. This method contacts the authentication server, and accepts VA2_NO as a parameter. As used herein, VA2_NO is the number of the site to which the link is transferring the user.

Also, in one or more embodiments of the invention, an authentication server (AS) reads out a pre-shared security association (SA) (that is, a secret phrase that the AS and the user share) with the user, thereby identifying to the user that s/he is communicating with the Authentication Server. In one or more embodiments of the invention, this SA can be obtained by doing a one time registration with the Authentication Server. As described previously, this can also be a short sonic sequence. The AS can then dynamically generate an SA, another short sonic sequence as described earlier, and read this out to the user. The user expects that when transferred to the other site, s/he will hear this same sonic sequence. Further, in one or more embodiments of the invention, the AS can also read out the Distinguished Name of the site to which the user is being transferred. The AS can now use https to contact the voice-site corresponding to VA2_NO, communicate the dynamically generated SA to the voice-site, and implement trasnferHSTPSession( )method of the spoken web protocol.

Also, the voice site corresponding to VA2_NO reads out the SA communicated by the AS. The user, hearing the same sonic sequence as previously read by the AS, is assured of the identity of the site to which s/he has been transferred. Further, in one or more embodiments of the invention, the identity of the site having been established, the remaining steps of https, for example, involving bulk encryption method/key selection can be carried out as is. Additionally, the SA can include any short sonic sequence, a phrase, a random k word combination, a sequence of numbers and/or a non-word sequence of sounds.

In one or more embodiments of the invention, a Telcom Provider entity can run the AS. This telecom provider can be expected to have the Distinguished Names of the voice site when the number corresponding to the site is provided by this telecom provider. An inter-Telco mechanism can be used to map numbers to distinguished names (DNs) (for example, as in the X509 specification) when the VA2_NO is from a different Telcom Provider. Also, in one or more embodiments of the invention, the AS can be hosted on an existing public key infrastructure (PKI). The voice site numbers can be made an attribute on certificates, and the certifying authorities and signature chaining approach used by existing PKI systems can be used to confirm voice site identities.

The techniques described herein can also include inserting an authentication step at the start of an IVR session. Also, in one or more embodiments of the invention, the user shares a security association (SA) with the authentication server, as previously described. The genuine IVR site will immediately direct the call to the AS. The AS can ask the user to input a personal identification number (PIN) that is, for example, distinct for this purpose only. Upon receipt of the correct PIN, the AS reads back the SA. If the user does not hear the correct secret back, the session is potentially hijacked and the SA compromised. The user can be instructed to contact the AS out of band and change the SA should this happen. Further, the AS can also read out the phone number (and where known) the Distinguished Name of the site that had forwarded the request thereto. If this is not what the user expected, he/she can disconnect.

One or more embodiments of the invention can additionally include, on encountering an HSTPS link, the VoiceSite invoking the link handling module. Also, a link can be a first-class component that can be inserted at appropriate places in a voice site. At such a point, the type of link could be specified. Further, the link handling module can transfer the call to an authentication server (AS) to authenticate the VA2_NO number. In one or more embodiments of the invention, the AS can have a pre-shared key with the caller obtained at the time of registering with the service provider.

Also, the AS can play a recorded identification of the VA2_NO voice site as obtained from the directory server (for instance, a white/yellow pages server that maps phone numbers to Names) per the preferred language settings in the caller's user profile. Additionally, in one or more embodiments of the invention, the AS can confirm whether the caller wants to proceed with the transfer. As with the AS, the directory server is also a trusted entity. In one or more embodiments of the invention, it may be co-located with, or distinct from, the Authentication Server.

Further, the AS can generate a spoken word shared key to be used for this particular secure transfer and play it to the caller. In one or more embodiments of the invention, the AS can also generate a text-based shared key. The AS obtains the address of the HSTP layer of VA2_NO, contacts it and supplies the spoken word shared key and/or the text shared key with it along with the phone number of the caller and VA1_NO, as well as a timeout.

Additionally, one or more embodiments of the invention can also include the AS transferring the call back to VA1_NO. The link handling module in VA1_NO can invoke transferHSTPsession, which can be a secured operation again. The transferHSTPsession module obtains the web service address of the HSTP layer of VA2_NO from the directory server and uses this address to make a web service call to VA2_NO which can be made over HTTPS in case of secured session transfer (for example, using the text shared key). The transferHSTPsession can additionally transfer the call to VA2_NO.

VA2_NO can play the spoken word shared key sent to it by AS for the session identified by <caller phone number, VA1_NO>. Also, in one or more embodiments of the invention, VA2_NO can ask for confirmation to proceed ahead. Further, the caller has the option to (1) hang up, (2) give a positive confirmation to go ahead with the call, or (3) give a negative confirmation. On providing a positive confirmation, the VA2_NO VoiceSite proceeds with its business logic which can include, for example, authenticating the caller through a personal identification number (PIN) and/or voice biometrics. On providing a negative confirmation, the command can be intercepted by the voice browser and it would bring the caller back to the original site, thus preventing the caller from inadvertently disclosing any information to the rouge site.

Additionally, the techniques described herein can also include bidirectional authentication. As detailed herein, one or more embodiments of the invention include an hstps protocol for proving the authenticity of the site to the user using a variety of mechanisms (for example, sonic sequences). They can also include the authenticated site asking the user to now authenticate themselves using a variety of mechanisms (for example, biometrics, passwords, pin numbers, etc.). Further, in one or more embodiments of the invention, providing secure interactions (where the site has been authenticated to the user, and optionally the user to the site) can further be utilized to deploy commercial applications that need a payment or need to convey some secure information (for example, micromarketing, voice web for a server message block (SMB), telesales in local area, access to sensitive information (for instance, interacting with a doctor or government office, etc.)).

FIG. 1 is a diagram illustrating an exemplary embodiment, according to an aspect of the invention. FIG. 1, by way of example, depicts an instance where the site to be authenticated is a payment gateway to which a user will be transferred by a Merchant's voice site upon making a purchase to make payments. As such, FIG. 1 depicts a user 102, a merchant VoiceSite (VA1) 104, an authentication server (AS) 106 and a payment gateway (VA2) (that is, the site to be authenticated) 108. Additionally, FIG. 1 depicts a number of steps occurring between the above-identified components. In step 110, the merchant VoiceSite 104 interacts with the user 102 to select an item, and step 112 includes the merchant VoiceSite 104 transferring the call with the selected item to the authentication server 106.

Step 114 includes the user 102 and authentication server 106 interacting to share a security association (SA), and step 116 includes the authentication server 106 playing a dynamically generated sonic sequence and identity of the payment gateway site for the user 102. In step 118, the authentication server 106 transfers the call with the dynamically generated sonic sequence and the selected item to the payment gateway 108. In step 120, the payment gateway 108 plays the sonic sequence received from AS 106 (as well as the identity) for the user 102 thus authenticating itself to the user, and step 122 includes exchanging a caller-identification, personal identification number (PIN), voice fingerprint and/or knowledge-based authentication of the user to the site. Additionally, step 124 includes the payment gateway 108 transferring the call to the merchant VoiceSite 104 based on the success or failure of the authentication and payment.

Figure 2:
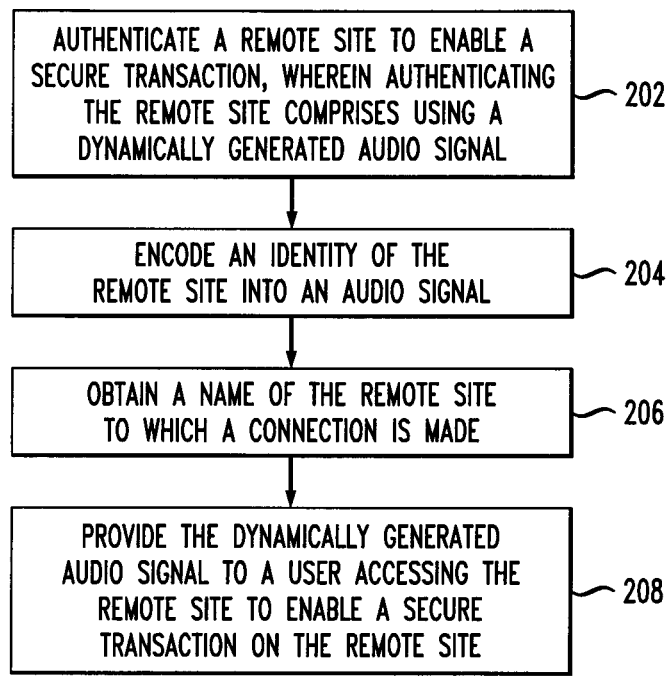
FIG. 2 is a flow diagram illustrating techniques for enabling a secure transaction with a remote site that uses voice interaction, according to an embodiment of the invention.

FIG. 2 is a flow diagram illustrating techniques for enabling a secure transaction with a remote site that uses voice interaction, according to an embodiment of the present invention. Step 202 includes authenticating a remote site (for example, a spoken web site) to enable a secure transaction, wherein authenticating the remote site comprises using a dynamically generated audio signal. Authenticating a remote site can include obtaining an audio signal that is dynamically generated by a trusted third party (for example, an authentication server). The trusted third party can also be authenticated by an audio signal with the signal being obtained by a user at a time of registering with an authentication server. This can typically be done when registering with a service provider.

Step 204 includes encoding an identity of the remote site into an audio signal. The audio signal can include a sonic sequence including, for example, a phrase, a word mixture, a sequence of numbers, a mixture of words and numbers, a non-word mixture, etc. The audio signal can be in any spoken language, but can also not be from any language (for example, from an arbitrary source).

Step 206 includes obtaining a name of the remote site to which a connection is made. Step 208 includes providing the dynamically generated audio signal to a user accessing the remote site to enable a secure transaction on the remote site (for example, wherein the user expects to hear the audio signal from the remote site to which the user attempts to access).

In one or more embodiments of the invention, the remote site can include an interactive voice response system (IVRS). Additionally, the techniques depicted in FIG. 2 can also include encoding an identity of the remote site into an audio signal, and providing the signal to a user accessing the remote site to enable a secure transaction on the remote site.

One or more embodiments of the invention also include extending secure socket layer (SSL) as well as transport layer security (TLS) to hyperspeech transfer protocol (HSTP) by replacing, in an authentication step, a standard format for a public key infrastructure (for example, X509v3 certificates) with a dynamically generated audio signal. Further, the techniques depicted in FIG. 2 can include confirming whether the user wants to proceed with accessing the spoken web site. Also, one or more embodiments of the invention include enabling the user to terminate a session, provide a positive confirmation to proceed, and/or provide a negative confirmation.

The techniques depicted in FIG. 2 can also, as described herein, provide a system, wherein the system includes distinct software modules, each of the distinct software modules being embodied on a tangible computer-readable recordable storage medium. The distinct software modules can include, for example, an authentication server module executing on a hardware processor.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system. Also, the techniques depicted in FIG. 2 can be implemented via cell phones. By way of example, the spoken web can be used by people on cell phones to implement the techniques in one or more embodiments of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 3:
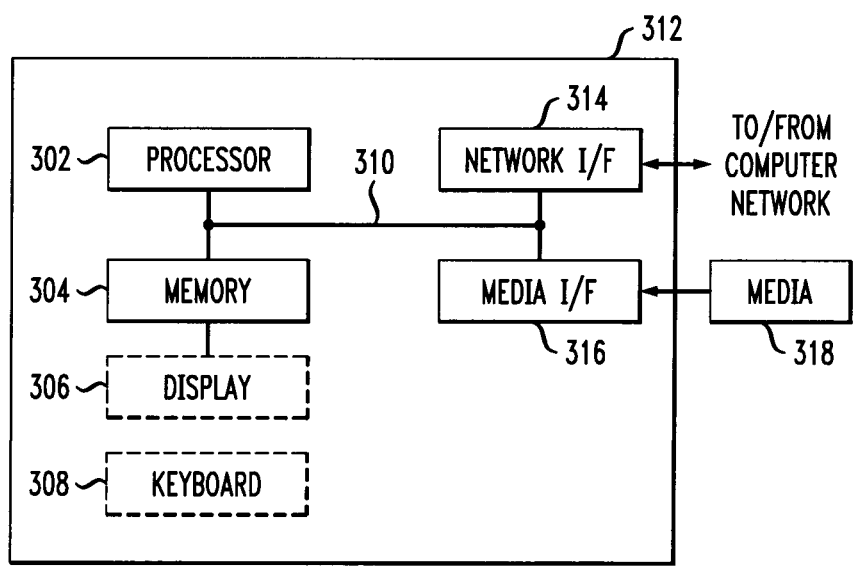
FIG. 3 is a system diagram of an exemplary computer system on which at least one embodiment of the invention can be implemented.

One or more embodiments can make use of software running on a general purpose computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or implementing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 318 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction implementation system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction implementation system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 1 and/or described herein. The method steps can then be carried out using the distinct software modules and/or sub-modules of the system, as described above, executing on one or more hardware processors 302. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, playing an audio signal corresponding to a location or site of a voice-based service in an interactive voice response system (IVRS).

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for enabling a secure transaction with a remote site that uses voice interaction, wherein the method comprises:
    receiving, by an authentication server, a request to connect a user to a remote site, wherein said receiving the request is carried out via at least one hardware processor;
    receiving, by the authentication server, an identity of the remote site, wherein said receiving the identity is carried out via at least one hardware processor;
    transmitting, by the authentication server to the user, a first security association, wherein the first security association is a previously-established secret identifier shared only with the user, and wherein said transmitting the first security association to the user is carried out via at least one hardware processor;
    dynamically generating, by the authentication server, a second security association by encoding the received identity of the remote site into an audio signal, wherein said generating is carried out via at least one hardware processor;
    transmitting, by the authentication server to the user, the generated second security association, wherein said transmitting the second security association to the user is carried out via at least one hardware processor; and
    transmitting, by the authentication server to the remote site, the generated second security association, wherein the transmitted second security association is for use in authenticating the remote site.

2. The method of claim 1, wherein said identity of the remote site comprises a name of the remote site.

3. The method of claim 1, wherein the remote site comprises a spoken web site, and wherein the method further comprises:
    authenticating the spoken web site;
    obtaining a name of the spoken web site to which a connection is being transferred over a voice link; and
    providing the dynamically generated audio signal to the user accessing the spoken web site to enable a secure transaction on the spoken web site, wherein the user expects to hear the audio signal from the spoken web site to which the user attempts to access.

4. The method of claim 1, wherein authenticating the remote site comprises obtaining an audio signal that is dynamically generated by a trusted third party.

5. The method of claim 4, where the trusted third party is authenticated by an audio signal with the signal being obtained by the user at a time of registering with the authentication server.

6. The method of claim 1, wherein the audio signal comprises a sonic sequence, wherein the sonic sequence comprises one of a phrase, a word mixture, a sequence of one or more numbers, a mixture of one or more words and one or more numbers, and a non-word mixture.

7. The method of claim 1, wherein in the remote site is an interactive voice response system (IVRS).

8. The method of claim 1, further comprising extending secure socket layer (SSL) to hyperspeech transfer protocol (HSTP) by replacing a standard format for a public key infrastructure with the dynamically generated second security association.

9. The method of claim 1, further comprising extending transport layer security (TLS) to hyperspeech transfer protocol (HSTP) by replacing a standard format for a public key infrastructure with the dynamically generated second security association.

10. The method of claim 1, further comprising confirming whether the user wants to proceed with accessing the remote site.

11. The method of claim 10, further comprising enabling the user to at least one of:
- terminate a session;
- provide a positive confirmation to proceed; and
- provide a negative confirmation.

* * * * *